Figure 1:
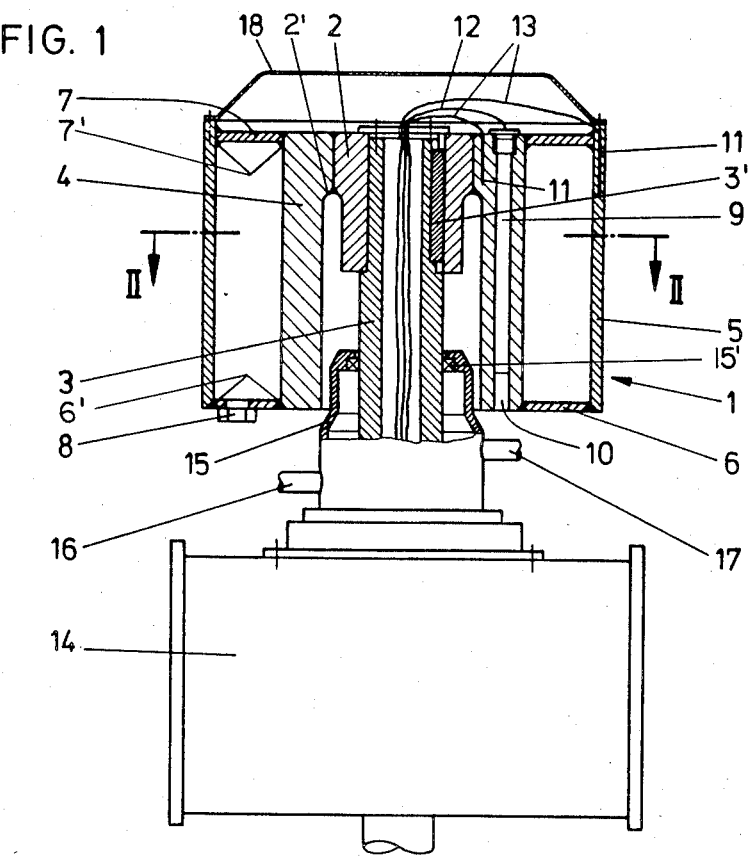

United States Patent [19]

Baumgartinger et al.

[11] Patent Number: 4,629,867
[45] Date of Patent: Dec. 16, 1986

[54] HEATED ROTATABLE ROLL ARRANGEMENT

[75] Inventors: Josef Baumgartinger, Ungenach; Ernst Rauch, Aurach a. Hongar; Haio Harms, Gmunden; Adalbert Wimmer, Vöcklabruck, all of Austria

[73] Assignee: Lenzing Aktiengesellschaft, Lenzing, Austria

[21] Appl. No.: 715,398

[22] Filed: Mar. 25, 1985

[30] Foreign Application Priority Data

Mar. 29, 1984 [AT] Austria .................................. 1061/84

[51] Int. Cl.$^4$ .......................... H05B 3/02; B21B 27/06
[52] U.S. Cl. ............................... 219/469; 219/10.61 R;
219/10.61 A; 219/244; 219/531; 219/470;
165/89; 432/60
[58] Field of Search ........ 219/471, 501, 530, 10.61 A,
219/10.61 R, 244, 470, 469, 531; 432/60;
165/89

[56] References Cited

U.S. PATENT DOCUMENTS

| | | | |
|---|---|---|---|
| 2,700,094 | 1/1955 | Hosack | 219/469 X |
| 2,834,860 | 5/1958 | Claiborne et al. | 219/469 |
| 3,020,383 | 2/1962 | Onishi et al. | 210/470 |
| 3,105,133 | 9/1963 | Norton | 219/469 |
| 3,286,081 | 11/1966 | Scowcroft | 219/470 |
| 3,290,485 | 12/1966 | Pettit | 219/470 |
| 3,417,219 | 12/1968 | Bailey | 219/10.61 |
| 3,484,581 | 12/1969 | Bliss | 219/469 |
| 3,600,550 | 8/1971 | Katsumata | 219/10.61 |
| 4,053,277 | 10/1977 | Bos et al. | 432/60 |
| 4,304,975 | 12/1981 | Lenk et al. | 219/469 X |

FOREIGN PATENT DOCUMENTS 1710643  4/1971  Fed. Rep. of Germany .
1462089 12/1965  France ............................ 219/469
427654  7/1967  Switzerland ..................... 219/469

OTHER PUBLICATIONS

Weast and Selby, 'Handbook of Chemistry and Physics', CRC, 48th Ed., p. F-17.
Schuh, 'Enzyklopädie Naturwissenschaft und Technik', Verlag Moderne Industrie, 1979, pp. 443, 444.

Primary Examiner—E. A. Goldberg
Assistant Examiner—Gerald E. Preston
Attorney, Agent, or Firm—Brumbaugh, Graves, Donohue & Raymond

[57] ABSTRACT

There is disclosed a heated roll for the thermal treatment of formed products. It includes a driven hollow shaft and a hollow roll body of a circular-ring-shaped cross section and closed on all sides to accommodate a heat transfer medium. Power supply lines for heating elements as well as electric wires of temperature probes are led through the hollow shaft. In order to provide a heated roll to be used without problems both in the low-temperature range and in the high-temperature range up to about 600° C. and to reach a uniform temperature profile over the total operation surface of the roll outer shell and a long service life of the heat transfer medium, without excessive temperature prevailing at the bearings of the driving shaft, and to provide for an easy repair, the hollow shaft is connected with the roll body by a hub. One or several saline compound(s) or (a) low-melting metal(s) or metal alloy(s) are contained in the interior of the hollow roll body. The heating elements are provided in the cylindrical inner part of the roll body. The temperature probes are arranged both in the cylindrical inner part and in the cylindrical outer shell, of the roll body.

9 Claims, 2 Drawing Figures

HEATED ROTATABLE ROLL ARRANGEMENT

The invention relates to a heated roll for the thermal treatment of formed products, comprising a driven hollow shaft and a hollow roll body of a circular-ring-shaped cross section and closed on all sides to accommodate a heat transfer medium, power supply lines for heating elements as well as electric wires of temperature probes being led through the hollow shaft.

A heated roll of this type is described in U.S. Pat. No. 3,020,383. The annular space between the cylindrical inner and outer walls of the roll body contains a heat transfer fluid, such as diphenyl tetrachloride or a eutectic mixture of phenyl ether and diphenyl.

In various production, finishing and processing phases of individual or bundled wires, fibers, threads and yarns, of various flat products, such as papers, sheets, laminates, layered materials, fiber materials, press plates, nonwovens and textile webs and of preflattened starting materials for such flat products (prior to the solidification of the same), a thermal treatment in a temperature range of up to 600° C. is required, such as, for instance, for drying, drawing, fixing, shrinking, curing, hot pressing, lining, laminating, rolling, surface-finishing, impregnating, and for various thermochemical reactions.

For such treatments, heated rolls or heated godets i.a. are used either individually or severally combined into, for instance, duos, trios or as pressing means. Known heated rolls may be heated by means of a heat transfer fluid circulating in the voids within the rolls. As heat transfer fluids for roll temperatures of up to about 250° C., so-called thermooils are usually used, like the heat transfer agents previously mentioned in connection with U.S. Pat. No. 3,020,383, for lower temperatures even water may be employed.

If higher roll temperatures than 250° C. are required, the common heating media are not applicable, because, for instance, the heating oils will start decomposing, and with other liquids very high vapor pressures must be taken into account. For reasons of operational safety, it is, however, generally sought to effect the heating of heated rolls without expensive and maintenance-intensive pressure systems.

In the high-temperature range of up to about 600° C., only few heating systems have hitherto been operated in practice. Such high temperatures are required, for instance, in the production of fibers, papers, laminated products or sheets of polytetrafluoroethylene, polybenzimidazoles or polyimides, having specially defined properties. In most cases, radiation heatings, such as quartz radiators, have been used for such purposes. This technique is subject to disturbances, and the rolls do have the desired constant temperature everywhere over their circumferences, but not over their lengths. In other words, the temperature profile attainable by radiation heatings is not sufficiently uniform. Thereby, deviations of certain properties of the ready products from the desired values occur.

The invention has as its object to eliminate the described disadvantages of known heating systems—in particular, in the high-temperature range—, and to provide a heated roll that meets the following demands both in the low-temperature range from about 150° C. and in the high-temperature range up to about 600° C.:

Uniform temperature profile over the total operation surface of the roll outer shell Long service life of the heat transfer medium No excessive temperatures at the bearings of the driving shaft Easy repair.

In accordance with the invention, the set object is achieved with a heated roll of the initially defined kind in that the hollow shaft is connected with the roll body by means of a hub, one or several saline compound(s) or (a) low-melting metal(s) or metal alloy(s) are contained in the interior of the hollow roll body, the heating elements are provided in the cylindrical inner part of the roll body, and the temperature probes are arranged both in the cylindrical inner part and in the cylindrical outer shell, of the roll body.

The heated roll according to the invention has a most uniform temperature profile, in particular when operating in the high-temperature range. The saline compound or the metal, with the operational temperatures of the roll, is present as a melt exhibiting an excellent thermal conductivity. The melt has a very low vapor pressure only, wherefor the hollow roll body need not be designed to be pressure-proof. The undesired heat transmission from the roll body to the hollow shaft substantially is reduced to the heat conducted by the hub, because the cylindrical inner part of the roll body is in direct connection with the hollow shaft via the hub only.

Advantageously, the hollow shaft, on the driven side, is surrounded by a cooling jacket at least over part of its length. This cooling jacket is sealed relative to the hollow shaft, a coolant flowing therethrough. In this manner, the thermal load on the bearings is even further reduced, their service lives thus being increased.

According to a particularly preferred embodiment, a plurality of heating rods are installed as the heating elements in radially evenly distributed bores extending in the axial direction in the inner part of the roll body.

The heating rods or heating cartridges are housed in a well protected manner, reach a particularly long service life and are, nevertheless, readily exchangeable. On the cylindrical outer jacket of the roll body, an extraordinarily uniform temperature distribution is attainable.

If too high a pressure is established in the interior of the roll body, which, however, is unlikely to occur, suitably a bursting disk is arranged on the driven-side end wall of the hollow roll body.

The opening provided for the bursting disk may be used for filling the saline compound or the metal into the roll body, prior to inserting and fastening the same.

On the free end wall of the roll, a covering hood is preferably provided.

As the saline compound(s) an inorganic salt or a mixture of such salts, having a melting point of between 120° and 350° C. and a low thermal expansion coefficient, as well as a gas amount necessary to allow for a thermal expansion, are advantageously present in the interior of the hollow roll body.

For instance, potassium nitrate, sodium nitrate, sodium nitrite, copper(I)-chloride or a mixture of two or more of these salts are suited therefor.

According to a further embodiment, a metal or an alloy or a mixture of metals or alloys, having a melting temperature of between about 50° and about 350° C., prefably tin, lead or Wood's alloy as well as a gas amount necessary to allow for a thermal expansion are present in the interior of the hollow roll body.

With the various operation temperatures, the saline melt or the molten metal occupy an appropriate volume. The free gas space in the interior of the roll body is calculated such that only a slight overpressure adjusts in the roll body with the most elevated operation temperature provided. Any known type of temperature probes, such as thermoelements or semiconductor-thermoprobes, may be used. Also are the temperature probes preferably arranged at equal distances from each other in the cylindrical inner part and in the cylindrical outer shell of the roll body. The wires from the temperature probes may be connected with measuring and control means via slip rings. The measuring current of the temperature probes may, however, also be transformed into high-frequency signals to be transmitted in a contactless manner.

The power supply lines, for the heating elements, which are led through the hollow shaft, suitably can be connected with a power source via slip rings. The heating capacity of the heating elements is controlled by the already mentioned control means of any known design. On account of the described disposition of temperature probes and heating elements and of the good thermal conductivity of the metal or saline melt, the temperature of the heating roll according to the invention can be adjusted to be extremely accurate. Moreover, a most uniform temperature profile over the total operation surface of the heating roll is attained.

Figure 2:
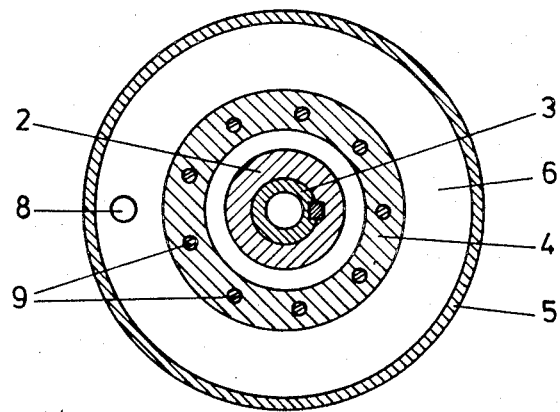

The invention will be explained in more detail by way of an embodiment illustrated in the accompanying drawing, wherein:

FIG. 1 is a section along the axis of the heated roll, with the bearing casing being schematically illustrated in continuation of the hollow shaft; and FIG. 2 is a section along line II—II of FIG. 1, without bearing casing.

A hollow roll body 1 is secured by welding 2', for example, to a hub 2, the hub 2 being fastened to one end of a hollow shaft 3 by means of a wedge connection 31. The cavity of the roll body 1, which is delimited by a cylindrical inner part 4, a cylindrical outer shell 5 and two circular-ring-shaped end walls 6 and 7, secured together by welds 6' and 7', for example, is filled with one or several saline compound(s) or one or several metal(s) or alloy(s) except for a precisely defined gas pad.

In the driven-side end wall 6, a bursting disk 8 is arranged. In the cylindrical inner part 4, electrical heating rods or heating cartridges 9 are inserted in bores 10 at equal distances in the axial direction. From the heating rods 9 as well as from temperature probes 11 arranged in the outer shell 5 and in the inner part 4, lines 12, 13 are led through the hollow shaft 3. In the schematically illustrated bearing casing 14, slip rings are provided, via which the electric power supply lines 12 for the heating rods 9 are connected with a power source. The connection of the electric wires 13 from the temperature probes 11 with the measuring and control means (not illustrated), as already mentioned, is effected either contactless or also via slip rings in the bearing casing 14. In order to reduce the thermal load on the bearing, a cooling jacket 15 is provided, which partially extends to below the inner part 4 of the roll body 1. The cooling jacket 15 is sealed with heat-resistant seals relative to the hollow shaft 3. Through pipe sections 16, 17, a coolant is supplied and discharged. To the free end side of the roll, a covering hood 18 is attached. The drive motor for the hollow shaft 3 is not illustrated.

Temperature measurements were carried out with a contact thermometer at a rotating heated roll according to the invention of the embodiment illustrated in the drawing, having an external diameter of 500 mm and a length of the roll body of 370 mm. The desired value of 312° C. was observed at any spot. On the outermost rims of the roll 308° C. were measured, shifted inwardly from the rims by 2 cm 309° C. were measured, and after further 2 cm 310° C. were already measured. Such a uniform temperature profile with a rim deviation in the range of about 1% only has not been attainable by conventional heated rolls or by known heating systems with such elevated temperatures.

What we claim is:

1. In a heated roll arrangement for thermally treating formed products, of the type including a driven hollow shaft, a hollow roll body of circular-ring shaped cross-section closed on all sides having a cylindrical inner part and a cylindrical outer shell and defining a cavity adapted to contain a heat transfer medium therein, electric heating elements, electric power supply lines for heating said heating elements, temperature probes and electric wires for said temperature probes, said power supply lines and said electric wires being led through said hollow shaft, the improvement wherein said hollow roll body is mounted on a hub secured at one end of said hollow shaft, said hub providing limited heat transmission from said hollow roll body to the hollow shaft, said heat transfer medium is contained in said cavity in the hollow roll body and is selected from the group consisting of at least one saline compound, at least one low-melting metal and at least one low-melting metal alloy, said heating elements are provided in said cylindrical inner part of said hollow roll body and evenly distributed therein, and said temperature probes are arranged both in said cylindrical inner part and in said cylindrical outer shell of said hollow roll body.

2. A heated roll arrangement as set forth in claim 1, further comprising a cooling jacket surrounding said hollow shaft on its drive side at least over part of its length.

3. A heated roll arrangement as set forth in claim 1, wherein said heating elements are comprised of a plurality of heating rods installed in radially evenly distributed bores extending in the axial direction in said inner part of said hollow roll body.

4. A heated roll arrangement as set forth in claim 1, wherein said hollow roll body has a drive-side end wall and a bursting disk arranged in said drive-side end wall.

5. A heated roll arrangement as set forth in claim 1, wherein said hollow body has a free end wall and a covering hood attached to said free end wall.

6. A heated roll arrangement as set forth in claim 1, wherein said at least one saline compound selected from the group consisting of an inorganic salt and a mixture of inorganic salts, having a melting point of between 120° and 350° C. and a low thermal expansion coefficient, and an amount of gas necessary to allow for a thermal expansion are contained in said interior of said hollow roll body.

7. A heated roll arrangement as set forth in claim 6, wherein said at least one saline compound is a salt selected from the group consisting of potassium nitrate, sodium nitrate, sodium nitrite, copper(I)-chloride and a mixture of at least two of said salts.

8. A heated roll arrangement as set forth in claim 1, wherein said metallic heat transfer medium selected from the group consisting of a metal, an alloy, and a mixture thereof, having a melting temperature of between about 50° and about 350° C., and an amount of gas necessary to allow for a thermal expansion are contained in said interior of said hollow roll body.

9. A heated roll arrangement as set forth in claim 8, wherein said metallic heat transfer medium is selected from the group consisting of tin, lead and Wood's alloy.

* * * * *